Jan. 24, 1961 J. J. SHYNE 2,969,294
METHOD OF IMPREGNATING URANIUM IN GRAPHITE
Filed March 18, 1954

*INVENTOR.*
JAMES J. SHYNE
BY
*William R. Lane*
ATTORNEY

United States Patent Office 2,969,294
Patented Jan. 24, 1961

2,969,294

METHOD OF IMPREGNATING URANIUM IN GRAPHITE

James J. Shyne, Arlington, N.J., assignor, by mesne assignments, to the United States of America as represented by the United States Atomic Energy Commission Filed Mar. 18, 1954, Ser. No. 417,099

9 Claims. (Cl. 117—119.2)

This invention relates to methods of impregnation, and particularly to an improved method of uniformly distributing a solid substance in the interconnected pores of a porous body.

It is frequently desirable to distribute one substance as uniformly as possible in a second substance. When both of these substances are normally in the solid state, the problem becomes increasingly difficult. Thus, for nuclear research reactors which utilize a solid core, a method is needed for uniformly distributing, in a predetermined concentration, a fissionable material in a solid moderator material. The moderator material most commonly used is graphite, a crystalline carbon. A block of graphite of any appreciable size has many minute interconnected pores. For the purposes of this application, interconnected pores are defined as those pores in a porous body which are connected to the outside, either directly or indirectly through other pores. A fluid from outside the block can thus be forced into these interconnected pores. By uniformly distributing the solid fissionable material in these interconnected pores, undesired localized high concentrations of fissionable material are avoided. These localized concentrations of fissionable material are a primary cause of the hot spots within the core during normal reactor operation. A second field in which an improved process for distributing a solid impregnate in a porous body is in the heterogeneous gas catalyst field. The chemical reactions of certain molecules are facilitated by the use of a suitable catalyst, such as platinum, nickel, copper or iron. When the molecules are in the gaseous phase while the catalyst is a solid, as is the case with heterogeneous gas catalysts, the rate of the reaction is dependent on the area of the exposed catalyst surface and on the physical state of the catalyst, i.e., an amorphous form is preferred. Thus, a finely divided nickel or solid nickel compound supported uniformly in the pores of a refractory having high porosity has utility in improving the gaseous reaction between a hydrocarbon and steam for the production of hydrogen and in aiding the formation of new compounds from acetylene and carbon monoxide. It is further noted that, in general, the activity of the catalyst is frequently dependent on its temperature of preparation with a lower temperature rendering a greater activity. Therefore, the desired gaseous reactions progress at an increased rate when the catalyst is finely divided and is uniformly dispersed through the pores of a supporting filter. Passage of the gases through this filter then produces the desired chemical reaction. When the catalyst is placed in the pores of the supporting filter by the process contemplated by this invention there is improved distribution and division of the catalyst particles in the pores.

In the past, the distribution of one solid substance in a second solid substance has usually been accomplished by grinding both substances into very fine powders. The two powders were then mixed thoroughly together, usually with a pitch, and the resulting mixture regraphitized by fusion. The uniformity of the resulting mixture was necessarily dependent on the fineness of the two powders and the thoroughness of the mixing step. In view of the relatively poor distribution obtained by the above process, alternative methods have been devised which utilized the natural porosity of the supporting substance and attempted to uniformly distribute a solid impregnate in the pores. One of these impregnation methods diffused a vapor containing the desired impregnate into the pores and decomposed the vapor in place, thereby depositing the solid impregnate in the pores. A second method filled the pores with a solution containing the impregnate as a part of the solute and then evaporated the liquid solvent, leaving the solute as a residue in the pores. These impregnation methods obtained only a limited degree of uniformity in the deposition of the impregnate in the pores. Each method lost uniformity by the movement or diffusion of the impregnate in the vapor or solution while the decomposition or evaporation step was taking place.

It is therefore an object of this invention to provide a method of impregnation of a porous body which prevents the movement or concentration of the impregnate in the pores during the depositing step.

It is another object of this invention to provide a method of improving the uniformity of distribution of an impregnate in the pores of a porous body.

It is a further object of this invention to provide a method of substantially uniformly distributing an impregnate throughout the pores of a porous body comprising filling the pores of said body with a solution containing said impregnate, freezing said solution in the pores of said body and sublimating the solvent of said solution out of said pores.

It is another object of this invention to provide a method of uniformly distributing in a predetermined concentration a solid substance through the interconnected pores of a porous body by determining the effective porosity of said porous body, by filling the pores of said porous body with a solution containing said solid substance in a predeterminable concentration, by quick-freezing said solution in said pores and by sublimating the solvent of said solution out of said pores, leaving said solid substance uniformly distributed through the interconnected pores of said porous body.

It is still another object of this invention to provide an improved method for constructing a fuel block for a nuclear reactor utilizing U–235 as the fuel, and graphite as the moderator material by constructing a block of graphite with the size and shape of the desired fuel block; by determining the effective porosity of said graphite block; by filling the pores of said graphite block with a solution of uranyl nitrate dihydrate in tertiary butyl alcohol, the concentration of U–235 in said solution being predetermined; by quick-freezing said solution in said pores; by sublimating substantially all of the tertiary butyl alcohol out of said solidified solution in said pores; and by decomposing the solid compound of uranium remaining in said pores to an oxide of uranium.

Other objects of invention will become apparent from the following description taken in connection with the accompanying drawings, in which Fig. 1 is a view of a block of porous material the shape of a fuel block for a solid homogeneous nuclear reactor;

By way of example only and not as a limitation, the process of impregnation contemplated by this invention is illustrated by the below-described steps leading to the construction of a fuel block for a homogeneous, graphite-moderated nuclear research reactor. The core of a homogeneous graphite nuclear research reactor is preferably composed of a plurality of individual fuel blocks in which uranium is homogeneously dispersed in a graphite moderator. This uranium is preferably highly enriched in U–235. (That is, a high percentage of the uranium atoms are the fissionable nuclide of the uranium element having a mass number of 235.) These U–235 atoms are the solid impregnate which is to be uniformly distributed throughout the interconnected pores of the graphite fuel blocks by the process contemplated by this invention. In addition to the uniform distribution of the U–235 impregnate in the pores, an accurate control over the concentration of the impregnate in the block is desired. Thus, the impregnation process deposits uniformly in the pores of the graphite block a predetermined mass of the impregnate, U–235, per unit volume of graphite. As an example, a typical graphite moderated research reactor has approximately 800 liters of graphite in the core to serve as the moderator for a mass of U–235 of approximately 3.5 kilograms. It is to be noted that the exact figures for particular reactors vary since they are dependent on the particular reactor design used. In this assumed example, a U–235 impregnate concentration of approximately 4.5 milligrams/cc. of graphite is desired in the fuel blocks.

Figure 1:
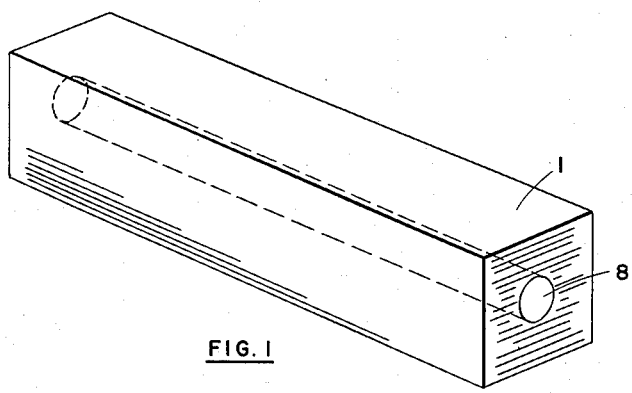

A typical fuel block is shown in Fig. 1. The size and shape of the fuel block may be varied. This particular block has physical dimensions of 4.18 inches on a side, 21 inches long, and a 1.25 inches-in-diameter coaxial hole extending the entire length. The research reactor has 140 of these fuel blocks in its core. In operation, the coaxial hole is used to convey a coolant fluid to thereby continuously cool the fuel blocks. Initially, blocks of pure porous graphite are constructed with the size and shape of the desired fuel blocks. Then, the effective porosity of each graphite block is found. This effective porosity is defined as the percentage ratio of the total volume of interconnected pores to the total volume of the graphite block. Crystalline graphite, i.e., graphite without any pores, has a density of 2.25 gm./cc. Commercially available graphite has a bulk density which is dependent on the process used in its manufacture. A typical commercial grade graphite has a bulk density of 1.7 gm./cc. The theoretical porosity of this commercial grade graphite calculated on the basis of zero porosity for crystalline graphite is therefore $.55/2.25 \times 100$, or 24.4 percent. However, not all of the pores in the graphite block are interconnected. Thus, approximately 20 percent by volume of the pores are closed off and thus inaccessible to the impregnating solution. This means that the effective porosity of a typical graphite block is (24.4) (.8) or approximately 19.5 percent.

Figure 2:
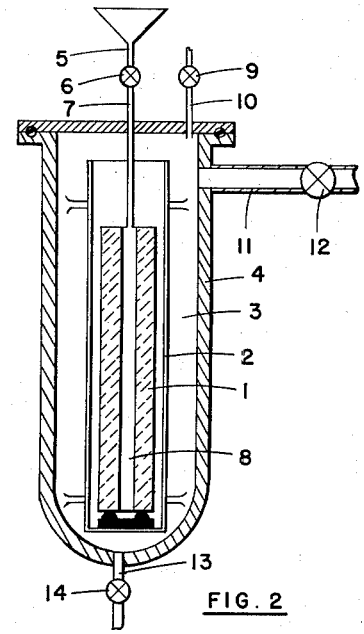
Fig. 2 is a sectioned view of apparatus for completely filling the interconnected pores of the block of Fig. 1 with a liquid.

The effective porosity of the graphite block is also determinable experimentally by utilizing the apparatus of Fig. 2. Graphite block 1 of known weight and volume is placed inside close-fitting, stainless steel can 2. Can 2 is supported in sealed chamber 3 of container 4. Solution funnel 5 with normally closed valve 6 in stem 7 is aligned with coaxial hole 8 of block 1. Normally closed valve 9 in tube 10 seals chamber 3 from the outside atmosphere. Tube 11 connects chamber 3 to an evacuating system (not shown) which is preferably a high vacuum pump capable of maintaining a vacuum of 0.1 mm. of Hg. Valve 12 is provided in tube 11 to isolate chamber 3 from the evacuating system. Tube 13 with normally closed valve 14 is connected to a source (not shown) of vapors at a predetermined pressure, as will be explained later. The effective porosity of block 1 is found by the following means. Sealed chamber 3 is evacuated to approximately 0.1 mm. Hg. This vacuum is maintained for a considerable length of time, such as an hour, to remove all the gases in the interconnected pores of block 1. A fluid of known density is placed in funnel 5. Valve 6 is opened, allowing the fluid to flow into can 2 until block 1 is completely submerged. An additional amount of fluid is provided to allow for subsequent filling of the interconnected pores with the fluid. Valve 6 is then closed. For reasons which will become apparent later, in the preferred process, liquid tertiary butyl alcohol (TBA) is used. At this point, only a relatively small amount of the fluid enters the interconnected pores of graphite block 1. The saturation of the pores with the fluid is accomplished by slowly raising the pressure in chamber 3 to atmospheric, thereby forcing the fluid into the pores. The pressure is raised by closing valve 12 and slowly opening valve 9. The temperature of the tertiary butyl alcohol (TBA) is measured, and block 1 is then withdrawn from chamber 3, drained and quickly weighed. The total volume of the interconnected pores is found by dividing the increase in weight of block 1 by the density of TBA at the measured temperature. The effective porosity of block 1 is found by dividing the total volume of the interconnected pores by the total volume of block 1. The tertiary butyl alcohol in the pores of graphite block 1 is removed by drying the block to a constant weight before beginning the impregnation step.

The impregnation fluid is now mixed. The concentration of the impregnate in the fluid needed to obtain the desired concentration of impregnate in the porous body is calculated from the effective porosity previously obtained. From the above example, assuming a desired impregnate density of 4.5 milligrams of U–235 per cubic centimeter of graphite and an effective porosity of 19.5 percent, a uniform mixture containing 4.5/.195 or 23.1 milligrams of U–235 per cubic centimeter of mixture fluid is prepared.

The preferred impregnation fluid is composed of a solution of uranyl nitrate dihydrate, $UO_2(NO_3)_2 \cdot 2H_2O$, in tertiary butyl alcohol, $(CH_3)_3COH$. The uranyl nitrate dihydrate (UND), used as the solute of this solution, is readily prepared by vacuum drying uranyl nitrate hexahydrate in a vacuum desiccator to a constant weight at 90° C. If the solution of this UND in TBA results in a turpid, orange-colored solution, some decomposition of the uranyl nitrate has probably occurred. The addition of a small amount of fuming nitric acid changes the color of the solution to a clear yellow.

It is assumed that the percentage enrichment of U–235 in the uranium of the uranyl nitrate dihydrate (UND) is known. If unknown, the percentage enrichment is readily obtainable by means well-known in the art. The gram molecular weight of the UND having the known percentage enrichment is found. For example, with a U–235 enrichment of 70 percent, the gram molecular weight of the solute is 428.19. Since the molecular weight of U–235 is 235.31, the concentration of the UND in the solution is

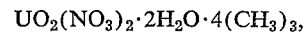

or 42.0 milligrams of 70 percent enriched UND per cubic centimeter of solution. The solution is prepared by dissolving the required amount of uranyl nitrate dihydrate in tertiary butyl alcohol. At the preferred impregnating temperature of 25° C., the tetra-tertiary butyl alcoholate of uranyl nitrate dihydrate, $$UO_2(NO_3)_2 \cdot 2H_2O \cdot 4(CH_3)_3,$$

is present. This compound is abbreviated UND-tetra-TBA. Thus, some of the TBA molecules are bounded to the UND molecules, while other TBA molecules are free. Pure TBA has a melting point of 25.5° C. and a boiling point of 82° C. Commercially available TBA containing approximately 0.2% water has a melting point of 25.4° C. The eutectic temperature of the UND-TBA mixture is 18.5° C. This means that as long as the temperature of the mixture is maintained below 18.5° C., the mixture is in the solid state. The saturated vapor pressure of TBA varies with its temperature. At 25° C., the preferred impregnating temperature, TBA has a saturated vapor pressure of 42 mm. of Hg; while at 17° C. it is 25 mm. of Hg. These comparatively high vapor pressures make TBA a very suitable solvent for the purposes of the process contemplated by this invention. After the dissolving of the UND in TBA, the solution is analyzed for uranium concentration by the precipitation of uranium as ammonium-diuranate followed by the decomposition to $UO_{2.656}$ in air at 850° C. If necessary, the concentration is corrected.

The impregnation procedure is very similar to the above-described procedure for the filling of the interconnected pores with TBA for the determination of the effective porosity. Referring again to Fig. 1, dry graphite block 1 is replaced in stainless steel can 2 which is supported in vacuum chamber 3. Chamber 3 is evacuated by an evacuation system (not shown) through open valve 12 to a pressure of 0.1 millimeter of Hg or less. Complete evacuation of the interconnected pores is insured by maintaining this vacuum in chamber 3 for an hour or more. Valve 12 is then closed, isolating chamber 3 from the evacuation system. Valve 14 in tube 13 is then opened, introducing TBA vapor to chamber 3 from a source (not shown). The pressure of this TBA vapor is preferably exactly equal to the vapor pressure of TBA at the temperature of the system. This prevents a change in U-235 concentration in the impregnation solution caused by evaporation of the TBA solvent.

All of the interconnected pores of graphite block 1 are now filled with a fluid which contains the desired impregnate, U-235, uniformly mixed throughout. It is desired to remove the fluid without disturbing the position of the impregnate. This is accomplished by first solidifying the fluid mixture in place in the pores and subsequently sublimating the solvent out of the pores without at any time allowing the mixture to liquify. Thus, in the preferred example, the UND-TBA mixture is solidified in place by freezing. Block 1 impregnated with the TBA solution of UND is withdrawn from chamber 3, permitted to drain slightly, and quick-frozen by lowering into liquid introgen. Any excess solution not drained from the surface of the block before freezing forms a surface scale on the block. This scale is easily removed by brushing. The temperature of block 1 and the impregnating solution at this stage is approximately −18° C.

Figure 3:
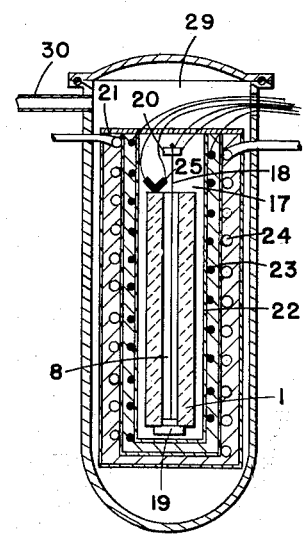
Fig. 3 is a sectioned view of apparatus for sublimating the solvent of the solidified solution out the pores of the block of Fig. 1.

Referring now to Fig. 3, block 1 is suspended in chamber 17 by suspension wire 18 attached between plug 19 and strain-gage balance beam 20 mounted on the underside of lid 21. The strain-gage balance beam is a convenient means for obtaining an indication of the weight or change in weight of block 1. From the finish of the freezing step to the completion of the sublimation step the temperature of block 1 and the impregnating solution is maintained below the eutectic temperature of the mixture. In the case of UND-TBA solution the eutectic temperature is 18.4° C. Therefore, the temperature of the system is maintained at 17° C.±0.1° C. At this temperature, liquefaction of the impregnating solution is impossible. The temperature of block 1 is controlled by a regulated radiant heating of block 1 from wall 22 of chamber 17. The temperature of wall 22 is rigidly controlled by electric heating windings 23 and a refrigerant flowing through copper coils 24. Iron-constantan thermocouple 25 is positioned to accurately measure the temperature of block 1. This thermocouple controls the current flowing in heater coil 23 to thereby continuously regulate the temperature of wall 22.

Figure 4:
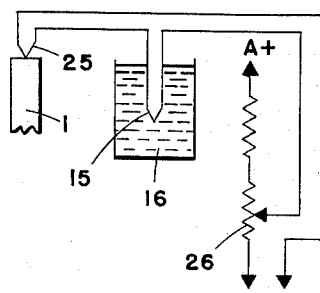
Fig. 4 is a schematic drawing of the temperature control circuit for the apparatus of Fig. 3.

A circuit for controlling this current is shown schematically in Fig. 4. Potentiometer 26 is set to give a signal equivalent to that of thermocouple 25 at the desired temperature of 17° C. Thermocouple 25 is referenced to a pre-set temperature by reference junction 15 positioned in a constant temperature fluid in container 16. The difference between the signal from potentiometer 26 and the signal from thermocouple 25 is fed into chopper 27. The output of chopper 27 is amplified in power amplifier 28. Power amplifier 28 controls the current flowing through coil 24.

Referring again to Fig. 3, a vacuum pump (not shown) is coupled to sealed chamber 29 through tube 30. This pump is energized to evacuate chamber 29. As previously pointed out, the temperature of block 1 is rigidly controlled at 17° C.±0.1° C. At this temperature, tertiary butyl alcohol has a vapor pressure of approximately 25 mm. of Hg. The evacuation system evacuates chambers 17 and 29 to approximately 1 mm. of Hg. Therefore, the free TBA in the pores of block 1 continuously sublimates out of the pores into chambers 17 and 29 and is removed by the evacuation system until substantially all of the free alcohol is removed. This condition is indicated when the weight of block 1, as measured by strain-gage balance beam 20, no longer decreases with time. The UND-tetra-TBA is now uniformly distributed in the interconnected pores as a solid residue.

Figure 5:
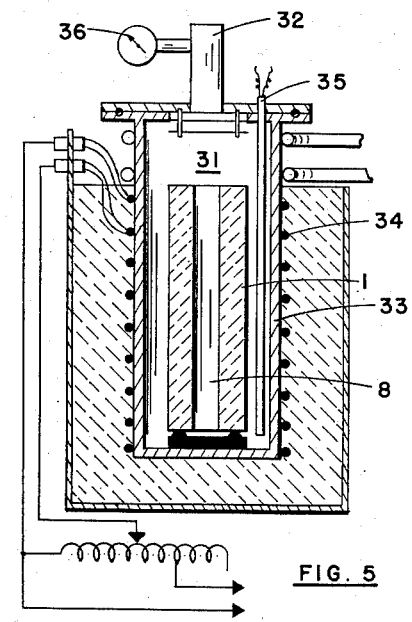
Fig. 5 is a sectioned view of apparatus for converting the unstable solid substance remaining in the pores of the block of Fig. 1 after the sublimation step, into a solid stable compound.

The manufacture of the fuel block for a nuclear research reactor is completed by decomposing the UND-tetra-TBA in a vacuum furnace to the uranium trioxide, and finally at a higher temperature to $UO_{2.1}$. In this state, a very stable compound of the impregnate, U-235, is uniformly distributed throughout the interconnected pores of the graphite block. A conversion furnace useful for decomposing the UND-tetra-TBA is shown in Fig. 5. Block 1 is placed in sealed chamber 31. A vacuum pump evacuates chamber 31 through tube 32. Block 1 is heated by radiant heating from wall 33 which, in turn, is heated by heating coil 34. The temperature of the system is continuously measured by a thermocouple in thermocouple wall 35. Block 1 is heated to 100° C. for approximately 2.5 hours in this conversion furnace to remove any water and bonded TBA. The temperature of block 1 is now raised to 250° C. for 1.5 hours to decompose the uranyl nitrate dihydrate. If the temperature of block 1 is now raised to 725° C. for an additional 1.5 hours, the compound containing the impregnate becomes $UO_{2.1}$. The evacuating system is continuously removing the gases of decomposition during the entire heating process. The return of the system pressure in chamber 31 to its base level as measured by gage 36 indicates that the conversion is complete.

In the above-described example of the impregnating process contemplated by this invention, a method for improving the uniformity of the distribution of the impregnate, U-235, in the interconnected pores of the porous body, a graphite-based fuel block is described. Although a specific impregnating solution is used for purposes of example, the process contemplated by this invention is not limited to the specific substances recited. In the selection of the compounds of the impregnating solution several factors are to be considered. On factor is the selection of a suitable solvent, or liquid carrier medium, which has certain desired physical and chemical properties. These properties include an ability to form a uniform mixture with the impregnate or with a compound containing the impregnate, an ability to solidify without expanding, and a reasonable sublimating rate. This sublimating rate is a direct function of the vapor pressure of the solvent when the solvent is in a solid state. Compounds, such as water, which expand when frozen are not very useful for the process of this invention unless the structural damage to the pores caused by the expansion of the solvent when solidified is permissible. The amount of water in the impregnating solution should therefore be kept at a minimum. There are numerous organic and inorganic solvents, such as the alcohols, which do not expand when frozen and which also have a comparatively high vapor pressure at temperatures just below the freezing point of the solvent. In the preferred embodiment of this invention, tertiary butyl alcohol was selected because of its high vapor pressure and because it solidifies at or near room temperatures, thereby eliminating the necessity of elaborate apparatus to maintain a low temperature during the sublimation step.

Another factor to be considered in the selection of compounds for the impregnating solution is the final condition of the impregnate in the pores. Of course, if the impregnate itself is soluble or can otherwise be uniformly mixed in the selected solvent, the problem is simplified to a direct mixture of solvent and impregnate. If, however, the impregnate must first be chemically combined with other elements into a compound which, in turn, is soluble in the selected solvent, care must be exercised to select a compound in which the elements do not affect the useful properties of the impregnate, or which decomposes to a simpler compound which may remain in the pores without affecting the properties of the impregnate.

Examples of other solvents, which may be frozen without expansion at reasonable temperatures and are readily sublimated, are ethyl alcohol, 2,4 dimethyl 3 pentanol, and 2,2 dimethyl 1 propanol. As examples of other solutes for the impregnation of graphite with U–235, uranyl acetate dihydrate, uranyl sulfate trihydrate, or uranyl oxalate dihydrate, all of which are alcohol soluble, can be used. When the process is used in the heterogeneous gas catalyst field, such solutes as nickel dimethyl glyoxine acid derivative or nickel formate dihydrate may be used to uniformly disperse finely divided nickel in the pores. Other well-known catalysts, such as copper and iron, may be deposited by utilizing such solutes as copper acetate and ferrous oxalate. There are numerous other solutes and solvents, well-known to those versed in the art, which have the above-described properties and which could be used in place of the above-listed compounds.

By utilizing the above-described process, a high degree of uniformity in the mixing of two solid substances—one, the impregnate and the other the support—is obtained. It is to be noted that the specific impregnating solution may be varied over wide ranges. Since the separation of the solvent from the solute takes place while the impregnating solution is in a solid state, there is no opportunity for the impregnate to diffuse through the interconnected pores during this separation step. Therefore, the distribution of the impregnate in the pores remains uniform during the depositing step.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A method of uniformly distributing uranium in a predetermined concentration in the interconnected pores of a graphite body comprising dissolving a uranium compound in a solvent capable of being sublimated to a concentration of uranium determined by the desired uranium concentration per unit volume of said graphite body multiplied by the ratio of the total volume of said graphite body to said total volume of said interconnected pores, said solvent having negligible expansion upon freezing, saturating said interconnected pores with the solution, quick-freezing said solution in said pores and sublimating the solvent of said solution out of said pores whereby said uranium compound remains uniformly distributed in the interconnected pores of said body at the desired concentration.

2. A method for constructing a fuel block for a solid homogeneous graphite-moderated nuclear research reactor comprising constructing a block of porous graphite in the size and shape of said fuel block; dissolving an alcohol-soluble compound of uranium in substantially water-free alcohol, the concentration of uranium in the resulting solution being determined by the desired uranium concentration per unit volume of said fuel block multiplied by the ratio of the total volume of said fuel block to the total volume of said interconnected pores; saturating the interconnected pores of said graphite block with said solution; quick-freezing said solution in the pores of said graphite block; and sublimating said alcohol out of the pores of said block whereby said uranium compound is uniformly distributed through the pores of said fuel block.

3. The construction method claimed in claim 2 in which said compound of uranium decomposes to a solid oxide of uranium when heated to a predetermined temperature and further comprising heating to at least said predetermined temperature said alcohol-soluble uranium compound uniformly distributed in said pores.

4. A method for constructing a fuel block for a nuclear reactor comprising constructing a block of porous graphite in the size and shape of said fuel block; dissolving a soluble compound of uranium enriched in the U–235 nuclide in a solvent capable of being sublimated and characterized by no expansion when frozen, the concentration of U–235 in the resulting solution being determined by the desired U–235 concentration per unit volume of said fuel block multiplied by the ratio of the total volume of said fuel block to the total volume of said interconnected pores; filling the interconnected pores of said graphite block with said solution; quick-freezing said solution in the pores of said graphite block; and sublimating said solvent out of the pores of said block whereby said uranium compound is uniformly distributed through the pores of said fuel block.

5. A method for constructing a fuel block for a nuclear research reactor utilizing U–235 as a fuel, and graphite as a moderator material comprising constructing a block of porous graphite in the size and shape of the desired fuel block; dissolving uranyl nitrate dihydrate in tertiary butyl alcohol, the uranium in said uranyl nitrate dihydrate being enriched in the U–235 nuclide and the concentration of the U–235 in the resulting solution being equivalent to the desired concentration of U–235 in said fuel block multiplied by the ratio of the total volume of said graphite block to the total volume of the interconnected pores in said graphite block; saturating the interconnected pores of said graphite block with said solution; quick-freezing said solution in place in the pores of said graphite body; sublimating substantially all the tertiary butyl alcohol out of said solution in said pores; and decomposing the solid compound of uranium remaining uniformly distributed in the pores to an oxide of uranium whereby said fuel block is composed of U–235 uniformly distributed in the form of a solid oxide through the pores of the graphite.

6. A method of impregnating a refractory body having interconnecting pores, which comprises saturating said body with an organic solution of a compound of a metal selected from the group consisting of nickel, copper, iron and uranium, the organic solvent portion of said solution having negligible expansion upon freezing being capable of being sublimated, freezing the resulting solution in said pores, and then sublimating said organic solvent out of said pores, whereby said compound remains uniformly distributed in said interconnecting pores.

7. The method of claim 6, wherein said refractory body is graphite.

8. The method of claim 7, wherein said organic solvent is an alcohol.

9. The method of claim 8, wherein said compound is selected from the group consisting of uranyl compounds, nickel dimethyl glyoxine, nickel formate dihydrate, copper acetate, and ferrous oxalate.

References Cited in the file of this patent

UNITED STATES PATENTS

| | | |
|---|---|---|
| 1,914,557 | Craver | June 20, 1933 |
| 1,979,124 | Tival | Oct. 30, 1934 |
| 2,121,637 | Lemmers et al. | June 21, 1938 |
| 2,239,800 | Vogt | Apr. 29, 1941 |
| 2,409,295 | Marvin | Oct. 15, 1946 |
| 2,564,776 | Bodkin et al. | Aug. 21, 1951 |
| 2,734,874 | Drake et al. | Feb. 14, 1956 |

FOREIGN PATENTS

| | | |
|---|---|---|
| 418,274 | Great Britain | June 5, 1933 |

OTHER REFERENCES

NAA–SR–240, U.S.A.E.C. document dated August 12, 1953, declassified April 3, 1957. Available on Microcard from AEC.